(12) United States Patent
Xie et al.

(10) Patent No.: US 10,168,830 B2
(45) Date of Patent: Jan. 1, 2019

(54) TOUCH SCREEN AND SMART TERMINAL

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Jianxing Xie, Guangdong (CN); Yucheng Tsai, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 218 days.

(21) Appl. No.: 14/905,227

(22) PCT Filed: Oct. 19, 2015

(86) PCT No.: PCT/CN2015/092209
§ 371 (c)(1),
(2) Date: Jan. 14, 2016

(87) PCT Pub. No.: WO2017/049683
PCT Pub. Date: Mar. 30, 2017

(65) Prior Publication Data
US 2017/0293393 A1    Oct. 12, 2017

(30) Foreign Application Priority Data

Sep. 24, 2015  (CN) .......................... 2015 1 0618209

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01); *G06F 3/0412* (2013.01)

(58) Field of Classification Search
CPC ....... G06F 3/0418; G06F 3/044; G06F 3/0412
See application file for complete search history.

(56) References Cited

U.S. PATENT DOCUMENTS

2016/0328037 A1* 11/2016 Zhuang ................... G06F 3/041
2016/0370928 A1* 12/2016 Hao ......................... G06F 3/044

FOREIGN PATENT DOCUMENTS

| CN | 104503652 A | * | 4/2015 | ............. G06F 3/044 |
| CN | 104820520 A | * | 8/2015 | ............. G06F 3/041 |

* cited by examiner

*Primary Examiner* — Srilakshmi K Kumar
*Assistant Examiner* — Brent D Castiaux
(74) *Attorney, Agent, or Firm* — Andrew C. Cheng

(57) ABSTRACT

The present invention discloses a touch screen and a smart terminal. the touch screen comprises m scan blocks, and the scan block comprises a GOA stage transfer circuit, n scan lines and at least one TP scan module, and the GOA stage transfer circuit is employed for inputting a STV signal and a CK signal, and the GOA stage transfer circuit comprises n GOA units which are cascade connected, and an ith GOA unit in the GOA stage transfer circuit is employed to charge an ith scan line, and an nth scan line is coupled to the at least one TP scan module; as scanning, the GOA stage transfer circuit in a jth scan block starts scanning under function of a jth STV signal.

16 Claims, 4 Drawing Sheets

TOUCH SCREEN AND SMART TERMINAL

CROSS REFERENCE

This application claims the priority of Chinese Patent Application No. 201510618209.9, entitled "Touch screen and smart terminal", filed on Sep. 24, 2015, the disclosure of which is incorporated herein by reference in its entirety.

FIELD OF THE INVENTION

The present invention relates to a display technology field, and more particularly to a touch screen and a smart terminal.

BACKGROUND OF THE INVENTION

With the development of the smart terminals, the product of unifying the display screen and the touch screen (generally in the name of touch control screen) has become more and more popular. For achieving display and touch control on the same screen. As shown in FIG. 1, the time division multiplexing method is commonly utilized in prior art. In one frame, the scan to the image signal is accomplished, and then the scan to the touch signal is finished. For instance, the time period of one frame is 16 milliseconds, wherein previous 12 milliseconds is employed to scan the image signal, and the latter 4 milliseconds is employed to scan the touch signal. However, at the each initial moment of scanning the touch signal, the present capacitance signal has to be acquired. The later judgment of the touch signal is based on this present capacitance signal. Thus, in the aforesaid time division multiplexing method, if the present capacitance signal is influenced by the environment, the judgment of the later touch signal will be incorrect.

SUMMARY OF THE INVENTION

The technical issue that the embodiment of the present invention solves is to provide a touch screen and a smart terminal, which can reduce the influence of the environment to the touch signal.

The present invention provides a touch screen, comprising m scan blocks, and the scan block comprises a GOA stage transfer circuit, n scan lines and at least one TP scan module, wherein a first input end of the GOA stage transfer circuit is employed for inputting a STV signal, and a second input end of the GOA stage transfer circuit is employed for inputting a CK signal, and the GOA stage transfer circuit comprises n GOA units which are cascade connected, and an ith GOA unit in the GOA stage transfer circuit is employed to charge an ith scan line, and an nth scan line is coupled to the at least one TP scan module; as scanning, the GOA stage transfer circuit in a jth scan block starts scanning under function of a jth STV signal, and in cooperation of the CK signal, the GOA stage transfer circuit accomplishes charging a first scan line by a first GOA unit to charging a nth scan line by an nth GOA unit, and after the nth GOA unit charged the nth scan line, a signal outputted by the nth scan line drives the at least one TP scan module to work, and m, n, i, j are all positive integers.

Selectably, after an ith scan block accomplishes scanning, an i+1th STV signal is inputted to an i+1th GOA stage transfer circuit to start scanning an i+1th scan block.

Selectably, at the same moment, the STV signal is respectively inputted to m GOA stage transfer circuits to start scanning m scan blocks at the same time.

Selectably, the m GOA stage transfer circuits share the CK signal.

The present invention further provides a touch screen, comprising m scan blocks, and the scan block comprises a GOA stage transfer circuit, n scan lines and at least one TP scan module, wherein a first input end of the GOA stage transfer circuit is employed for inputting a STV signal, and a second input end of the GOA stage transfer circuit is employed for inputting a first CK signal, and the GOA stage transfer circuit comprises n GOA units which are cascade connected, and an ith GOA unit in the GOA stage transfer circuit is employed to charge an ith scan line, and one end of the TP scan module is employed for inputting a second CK signal, and the other end of the TP scan module is employed for outputting a TP scanning signal, and as scanning, the GOA stage transfer circuit in a jth scan block starts scanning under function of a jth STV signal, and in cooperation of the first CK signal, the GOA stage transfer circuit accomplishes charging a first scan line by a first GOA unit to charging a nth scan line by an nth GOA unit, and after the nth GOA unit charged the nth scan line, the second CK signal drives the at least one TP scan module to work, and m, n, i, j are all positive integers.

Selectably, after an ith scan block accomplishes scanning, an i+1th STV signal is inputted to an i+1th GOA stage transfer circuit to start scanning an i+1th scan block.

Selectably, at the same moment, the STV signal is respectively inputted to m GOA stage transfer circuits to start scanning m scan blocks at the same time.

Selectably, the m GOA stage transfer circuits share the first CK signal.

The present invention provides a smart terminal, comprising a touch screen, and the touch screen comprises m scan blocks, and the scan block comprises a GOA stage transfer circuit, n scan lines and at least one TP scan module, wherein a first input end of the GOA stage transfer circuit is employed for inputting a STV signal, and a second input end of the GOA stage transfer circuit is employed for inputting a CK signal, and the GOA stage transfer circuit comprises n GOA units which are cascade connected, and an ith GOA unit in the GOA stage transfer circuit is employed to charge an ith scan line, and an nth scan line is coupled to the at least one TP scan module; as scanning, the GOA stage transfer circuit in a jth scan block starts scanning under function of a jth STV signal, and in cooperation of the CK signal, the GOA stage transfer circuit accomplishes charging a first scan line by a first GOA unit to charging a nth scan line by an nth GOA unit, and after the nth GOA unit charged the nth scan line, a signal outputted by the nth scan line drives the at least one TP scan module to work, and m, n, i, j are all positive integers.

Selectably, after an ith scan block accomplishes scanning, an i+1th STV signal is inputted to an i+1th GOA stage transfer circuit to start scanning an i+1th scan block.

Selectably, at the same moment, the STV signal is respectively inputted to m GOA stage transfer circuits to start scanning m scan blocks at the same time.

Selectably, the m GOA stage transfer circuits share the CK signal.

The present invention further provides a smart terminal, comprising a touch screen, and the touch screen comprises m scan blocks, and the scan block comprises a GOA stage transfer circuit, n scan lines and at least one TP scan module, wherein a first input end of the GOA stage transfer circuit is employed for inputting a STV signal, and a second input end of the GOA stage transfer circuit is employed for inputting a first CK signal, and the GOA stage transfer circuit comprises n GOA units which are cascade connected, and an ith GOA unit in the GOA stage transfer circuit is employed to charge an ith scan line, and one end of the TP scan module is employed for inputting a second CK signal, and the other end of the TP scan module is employed for outputting a TP scanning signal, and as scanning, the GOA stage transfer circuit in a jth scan block starts scanning under function of a jth STV signal, and in cooperation of the first CK signal, the GOA stage transfer circuit accomplishes charging a first scan line by a first GOA unit to charging a nth scan line by an nth GOA unit, and after the nth GOA unit charged the nth scan line, the second CK signal drives the at least one TP scan module to work, and m, n, i, j are all positive integers.

Selectably, after an ith scan block accomplishes scanning, an i+1th STV signal is inputted to an i+1th GOA stage transfer circuit to start scanning an i+1th scan block.

Selectably, at the same moment, the STV signal is respectively inputted to m GOA stage transfer circuits to start scanning m scan blocks at the same time.

Selectably, the m GOA stage transfer circuits share the first CK signal.

The touch screen provided by the present invention is divided into a plurality of scan blocks to be scanned. After the scan to the previous scan block is accomplished, the touch signal is scanned. After the scan to the touch signal is accomplished, the next scan block is scanned. With the aforesaid arrangement, the multiple time scans can be implemented to the touch signal in one frame period to prevent that the capacitance signal detected at the initial moment of scanning the touch signal is incorrect, and the correct judgment of the touch signal is influenced in the long time.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Specifically, the terminologies in the embodiments of the present invention are some features and advantages of the invention are merely for describing the purpose of the certain embodiment, but not to limit the invention. Examples and the appended claims be implemented in the present invention requires the use of the singular form of the book "an", "the" and "the" are intended to include most forms unless the context clearly dictates otherwise. It should also be understood that the terminology used herein that "and/or" means and includes any or all possible combinations of one or more of the associated listed items.

Figure 1:
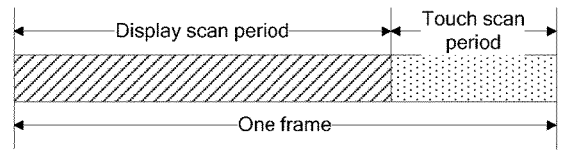
FIG. 1 is a time sequence diagram of image signal scanning and touch signal scanning in one frame according to prior art.
Figure 2:
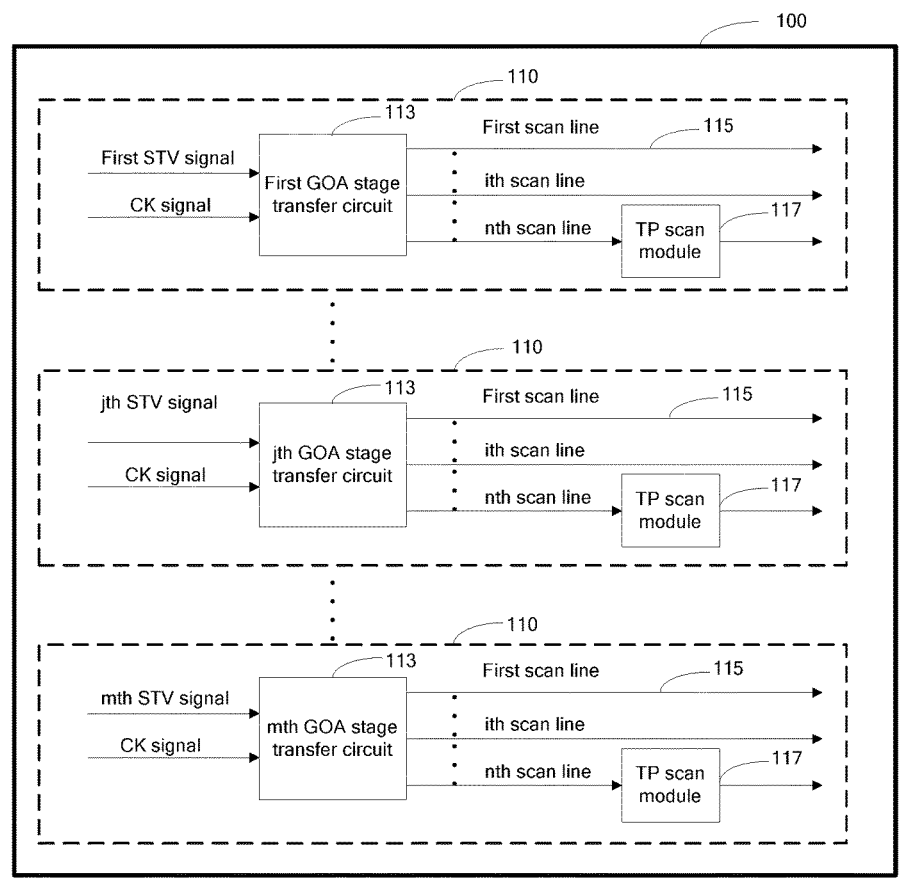
FIG. 2 is a structure diagram of one touch screen provided by the embodiment of the present invention.

Please refer to FIG. 2. FIG. 2 is a structure diagram of one touch screen provided by the embodiment of the present invention. The touch screen 100 of this embodiment comprises m scan blocks 110.

Figure 3:
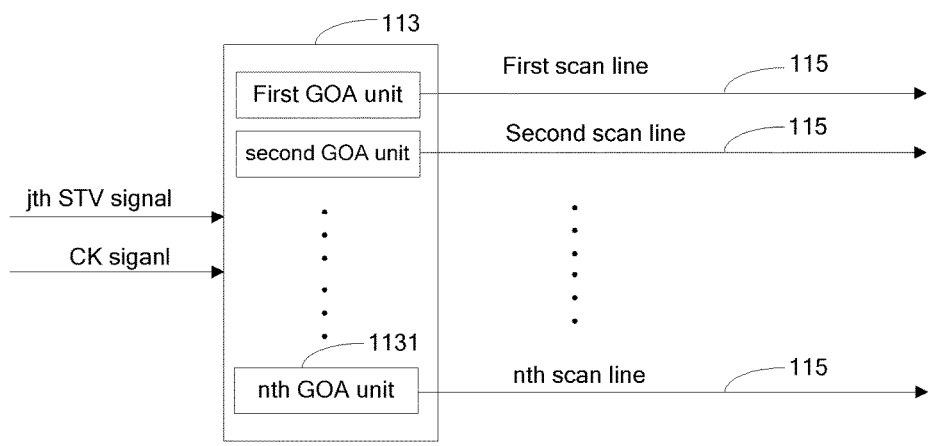
FIG. 3 is structure diagram of a GOA stage transfer circuit of one touch screen provided by the embodiment of the present invention.

Each scan block 110 comprises a GOA (Gate Driver On Array) stage transfer circuit 113, n scan lines 115 and at least one TP (touch panel) scan module 117. Please refer to FIG. 3 together. A first input end of the GOA stage transfer circuit 113 is employed for inputting a STV signal, and a second input end of the GOA stage transfer circuit 113 is employed for inputting a CK (clock) signal, and the GOA stage transfer circuit 113 comprises n GOA units 1131 which are cascade connected, and an ith GOA unit 1131 in the GOA stage transfer circuit 113 is employed to charge an ith scan line 115, and an nth scan line 115 is coupled to the at least one TP scan module 117. The CK signals in the different scan blocks 110 can be solo, or can be multiplexed.

As scanning, a first STV signal in inputted to the GOA stage transfer circuit 113 in the first scan block 110 to start scanning the first scan block 110. In cooperation of the CK signal, the GOA stage transfer circuit 113 in the first scan block 110 controls and accomplishes charging the first scan line 115 by the first GOA unit 1131 to charging the nth scan line 1131 by the nth GOA unit 115 for accomplishing the scan to the image signal of the first scan block 110. After the nth GOA unit 1131 in the first scan block 110 charged the nth scan line 115, the signal outputted by the nth scan line 115 drives the TP scan module 117 to work for accomplishing the scan to the touch signal of the first scan block 110. After the scan to the first scan block 110 is accomplished, the second STV signal is inputted to the GOA stage transfer circuit 113 in the second scan block 110 to start scanning the second scan block 110. In cooperation of the CK signal, the GOA stage transfer circuit 113 in the second scan block 110 controls and accomplishes charging the first scan line 115 by the first GOA unit 1131 to charging the nth scan line 1131 by the nth GOA unit 115 for accomplishing the scan to the image signal of the second scan block 110. After the nth GOA unit 1131 in the second scan block 110 charged the nth scan line 115, the signal outputted by the nth scan line 115 drives the TP scan module 117 to work for accomplishing the scan to the touch signal of the second scan block 110, and so on until the scan to the mth scan block is accomplished.

Figure 4:
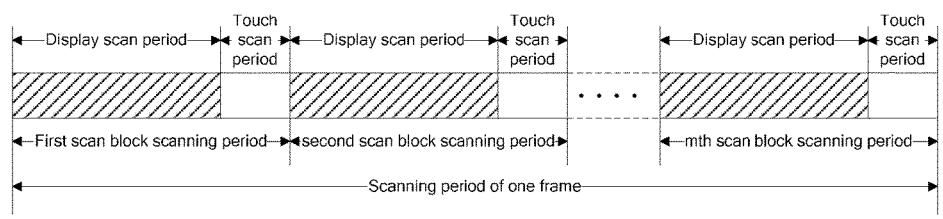
FIG. 4 is time sequence diagram of sequentially scanning the scan blocks in one touch screen provided by the embodiment of the present invention.

Please refer to FIG. 4 together. By employing the aforesaid method, the touch screen 100 can be divided into a plurality of scan blocks 110 to be sequentially scanned. Meanwhile, there is the scanning period in the scanning period of each scan block 110. Thus, in the scanning period of one frame, there can be scanning periods of a plurality of independent touch signals. For instance, the time period of one frame is 16 milliseconds, and the touch screen 100 is divided into four scan blocks 110 for scanning. The scanning period of each scan block 110 is 4 milliseconds. In the scanning period of each scan block 110, the previous 3 milliseconds is the scanning period of the display signal, and the latter 1 millisecond is the scanning period of the touch signal. Thus in the period of one frame, there are scanning periods of 4 independent touch signals respectively. Because in the scanning period of one frame, there are scanning periods of a plurality of independent touch signals, even the capacitance signal measured at the initial moment of the scanning period of one touch signal is influenced by the environment, and no influence is caused to the touch signal of the scanning period of other touch signals.

It is understandable that the scanning period of each scan block 110 can be set to be the same, or can be set to be different. Similarly, the scanning periods of the image signals in different scan blocks 110 can be set to be the same, or can be set to be different. The scanning periods of the touch signals in different scan blocks 110 can be set to be the same, or can be set to be different.

In other embodiment, the structure of the touch screen 100 is unchanged, and meanwhile, the size of each scan block 110 is the same. However as scanning, at the same moment, the STV signal is respectively inputted to m GOA stage transfer circuits 113 to start scanning m scan blocks at the same time. Namely, at the same moment, the first STV signal is inputted to the GOA stage transfer circuits 113 in the first scan block 110, and the second STV signal is inputted to the GOA stage transfer circuits 113 in the second scan block 110, and . . . , and the mth STV signal is inputted to the GOA stage transfer circuits 113 in the mth scan block 110 to start scanning the first to the mth scan blocks 110. In cooperation of the CK signal, the GOA stage transfer circuits 113 in the respective scan blocks 110 control and accomplish charging the first scan lines 115 by the first GOA unit 1131 to charging the nth scan line 115 by the nth GOA unit 1131 for accomplishing the scan to the image signals of the respective scan blocks 110 at the same time. After the respective scan blocks 110 accomplish the scan to the image signals at the same time, the nth scan lines 115 of the respective scan blocks 110 output signals at the same time to drive the TP scan modules 117 to work.

Figure 5:
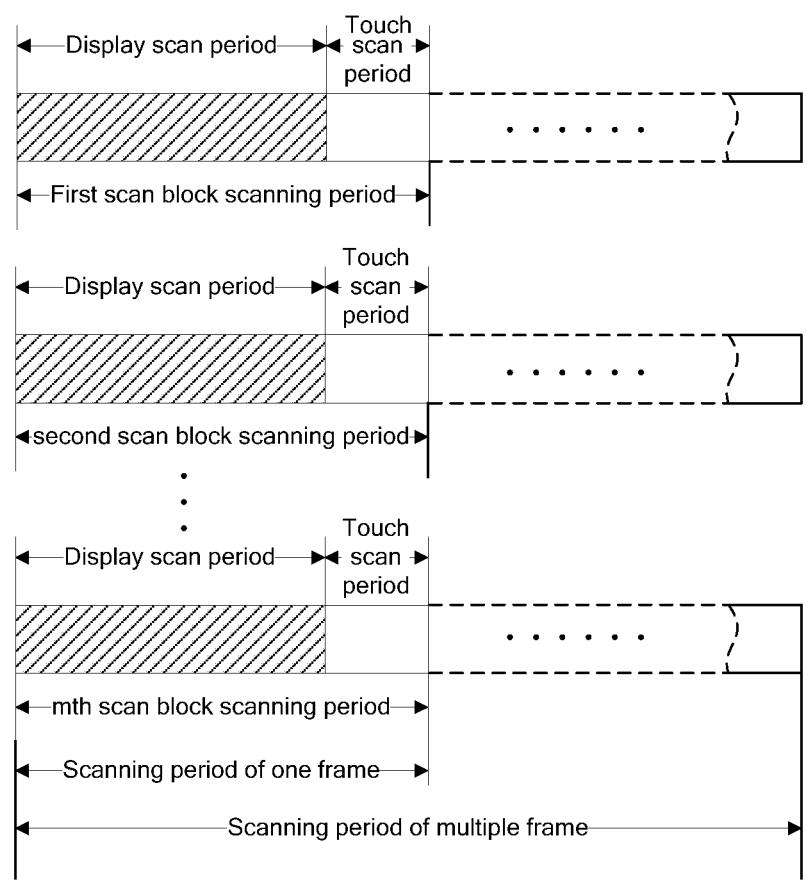
FIG. 5 is time sequence diagram of scanning the scan blocks at the same time in one touch screen provided by the embodiment of the present invention.

Please refer to FIG. 5 together. By employing the aforesaid method, the touch screen 100 can be divided into a plurality of scan blocks 110 to be scanned at the same time. Therefore, the period of scanning the touch screen 100 is enormously decreased, and the period of scanning the touch signal of the touch screen is enormously decreased, too. For instance, the touch screen 100 is divided into 4 scan blocks 110 to be scanned at the same time. Previously, it takes 16 milliseconds to accomplish scanning the touch screen 100, wherein 12 milliseconds is the scanning period of the image signal of the touch screen 100, and 4 milliseconds is the scanning period of the touch signal of the touch screen 100. After dividing the scan blocks 110 to be scanned at the same time, it only takes 4 milliseconds to accomplish scanning the touch screen 100, wherein 3 milliseconds is the scanning period of the image signal of the touch screen 100, and 1 millisecond is the scanning period of the touch signal of the touch screen 100. Therefore, the period of scanning the touch screen 100 is enormously decreased, and the period of scanning the touch signal of the touch screen is enormously decreased, too. Therefore, in the same period, the method of dividing the touch screen 100 into a plurality of scan blocks 110 to be scanned at the same time can raise the scanning number of the touch signal. Even the capacitance signal measured at the initial moment of the scanning period of one touch signal is influenced by the environment, and no influence is caused to the scan of other touch signals.

Figure 6:
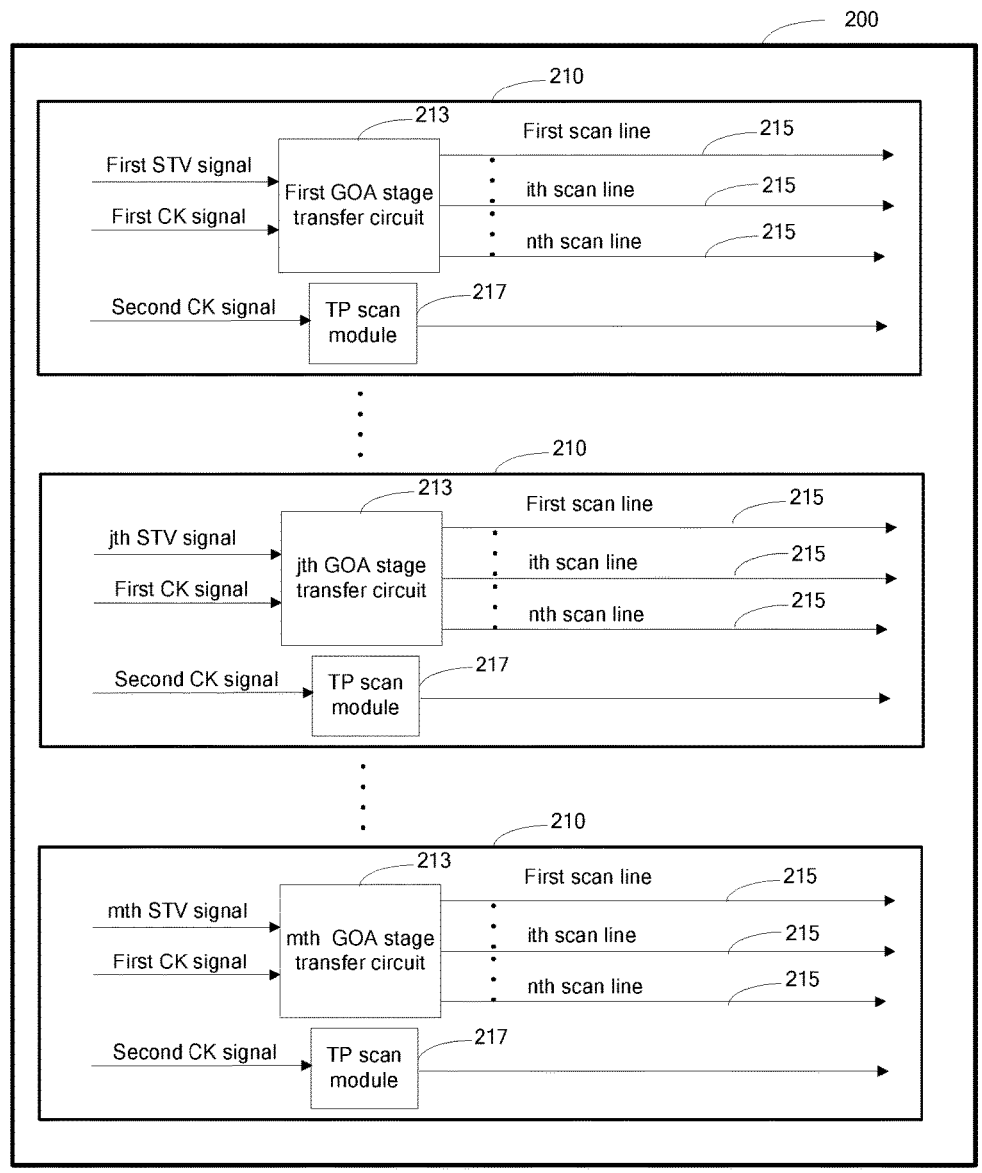
FIG. 6 is structure diagram of another touch screen provided by the embodiment of the present invention.

Please refer to FIG. 6. FIG. 6 is structure diagram of another touch screen provided by the embodiment of the present invention. The touch screen 200 of this embodiment comprises: m scan blocks 210.

Each scan block 210 comprises a GOA stage transfer circuit 213, n scan lines 215 and at least one TP scan module 217. The structure of the GOA stage transfer circuit 213 is the same as the structure of the GOA stage transfer circuit 113 shown in FIG. 3. A first input end of the GOA stage transfer circuit 213 is employed for inputting a STV signal, and a second input end of the GOA stage transfer circuit 213 is employed for inputting a first CK signal, and the GOA stage transfer circuit 213 comprises n GOA units which are cascade connected, and an ith GOA unit in the GOA stage transfer circuit 213 is employed to charge an ith scan line 215, and one end of the TP scan module 217 is employed for inputting a second CK signal, and the other end of the TP scan module 217 is employed for outputting a TP scanning signal. The first CK signals and the second CK signals in different scan blocks 210 can be solo, or can be multiplexed.

As scanning, a first STV signal in inputted to the GOA stage transfer circuit 213 in the first scan block 210 to start scanning the first scan block 210. In cooperation of the first CK signal, the GOA stage transfer circuit 213 in the first scan block 210 controls and sequentially accomplishes charging the first scan line 215 by the first GOA unit to charging the nth scan line 215 by the nth GOA unit for accomplishing the scan to the image signal of the first scan block 210. After the nth GOA unit in the first scan block 110 charged the nth scan line 215, the second CK signal is inputted to the TP scan module 217 in the first scan block 210 to start the scan to the touch signal of the first scan block 210 by the TP scan module 217 in the first scan block 210. After the scan to the first scan block 210 is accomplished, the second STV signal is inputted to the GOA stage transfer circuit 213 in the second scan block 210 to start scanning the second scan block 210. In cooperation of the first CK signal, the GOA stage transfer circuit 213 in the second scan block 210 controls and sequentially accomplishes charging the first scan line 215 by the first GOA unit to charging the nth scan line 215 by the nth GOA unit for accomplishing the scan to the image signal of the second scan block 210. After the nth GOA unit in the second scan block 110 charged the nth scan line 215, the second CK signal is inputted to the TP scan module 217 in the second scan block 210 to start the scan to the touch signal of the second scan block 210 by the TP scan module 217 in the second scan block 210, and so on until the scan to the mth scan block is accomplished.

Please refer to FIG. 4 together. By employing the aforesaid method, the touch screen 200 can be divided into a plurality of scan blocks 210 to be sequentially scanned. Meanwhile, there is the scanning period in the scanning period of each scan block 210. Thus, in the scanning period of one frame, there can be scanning periods of a plurality of independent touch signals. For instance, the time period of one frame is 16 milliseconds, and the touch screen 200 is divided into four scan blocks 210 for scanning. The scanning period of each scan block 210 is 4 milliseconds. In the scanning period of each scan block 210, the previous 3 milliseconds is the scanning period of the display signal, and the latter 1 millisecond is the scanning period of the touch signal. Thus in the period of one frame, there are scanning periods of 4 independent touch signals respectively. Because in the scanning period of one frame, there are scanning periods of a plurality of independent touch signals, even the capacitance signal measured at the initial moment of the scanning period of one touch signal is influenced by the environment, and no influence is caused to the touch signal of the scanning period of other touch signals.

It is understandable that the scanning period of each scan block 210 can be set to be the same, or can be set to be different. Similarly, the scanning periods of the image signals in different scan blocks 210 can be set to be the same, or can be set to be different. The scanning periods of the touch signals in different scan blocks 210 can be set to be the same, or can be set to be different.

In other embodiment, the structure of the touch screen 200 is unchanged, and meanwhile, the size of each scan block 210 is the same. However as scanning, at the same moment, the STV signal is respectively inputted to m GOA stage transfer circuits 213 to start scanning m scan blocks at the same time. Namely, at the same moment, the first STV signal is inputted to the GOA stage transfer circuits 213 in the first scan block 210, and the second STV signal is inputted to the GOA stage transfer circuits 213 in the second scan block 210, and . . . , and the mth STV signal is inputted to the GOA stage transfer circuits 213 in the mth scan block 210 to start scanning the first to the mth scan blocks 210. In cooperation of the CK signal, the GOA stage transfer circuits 213 in the respective scan blocks 210 control and accomplish charging the first scan lines 215 by the first GOA unit to charging the nth scan line 215 by the nth GOA unit for accomplishing the scan to the image signals of the respective scan blocks 210 at the same time. After the respective scan blocks 210 accomplish the scan to the image signals at the same time, the second CK signal can be inputted to the TP scan modules 217 in the respective scan blocks 210 at the same time to drive the TP scan modules 217 in the respective scan blocks 210 to work.

Please refer to FIG. 5 together. By employing the aforesaid method, the touch screen 200 can be divided into a plurality of scan blocks 210 to be scanned at the same time. Therefore, the period of scanning the touch screen 200 is enormously decreased, and the period of scanning the touch signal of the touch screen is enormously decreased, too. For instance, the touch screen 200 is divided into 4 scan blocks 210 to be scanned at the same time. Previously, it takes 16 milliseconds to accomplish scanning the touch screen 200, wherein 12 milliseconds is the scanning period of the image signal of the touch screen 200, and 4 milliseconds is the scanning period of the touch signal of the touch screen 200. After dividing the scan blocks 210 to be scanned at the same time, it only takes 4 milliseconds to accomplish scanning the touch screen 200, wherein 3 milliseconds is the scanning period of the image signal of the touch screen 200, and 1 milliseconds is the scanning period of the touch signal of the touch screen 200. Therefore, the period of scanning the touch screen 200 is enormously decreased, and the period of scanning the touch signal of the touch screen is enormously decreased, too. Therefore, in the same period, the method of dividing the touch screen 200 into a plurality of scan blocks 210 to be scanned at the same time can raise the scanning number of the touch signal. Even the capacitance signal measured at the initial moment of the scanning period of one touch signal is influenced by the environment, and no influence is caused to the scan of other touch signals.

The present invention further provides a smart terminal, comprising the touch screen shown in FIG. 2 or shown in FIG. 6. The detail specification can be referred to FIG. 2, FIG. 6 and related descriptions. The repeated description is omitted here.

It is understandable in practical to the person who is skilled in the art that all or portion of the processes in the method according to the aforesaid embodiment can be accomplished with the computer program to instruct the related hardwares. The program can be stored in a readable storage medium if the computer. As the program is executed, the processes of the embodiments in the aforesaid respective methods can be included. The storage medium can be a hardisk, an optical disc, a Read-Only Memory (ROM) or a Random Access Memory (RAM).

Above are embodiments of the present invention, which does not limit the scope of the present invention. Any modifications, equivalent replacements or improvements within the spirit and principles of the embodiment described above should be covered by the protected scope of the invention.

What is claimed is:

1. A touch screen, comprising m scan blocks,
wherein each of the m scan blocks comprises a gate-driver-on-array (GOA) stage transfer circuit, n scan lines and at least one touch pane (TP) scan module, wherein a first input end of the GOA stage transfer circuit receives a STV signal and a second input end of the GOA stage transfer circuit receives a CK signal, and the GOA stage transfer circuit comprises n GOA units which are cascade connected and respectively correspond to the n scan lines such that an ith GOA unit of the GOA stage transfer circuit is operable to charge an ith scan line, and an nth scan line is coupled to the at least one TP scan module;
wherein in a scanning operation, the GOA stage transfer circuit of a jth scan block starts scanning upon receiving a jth STV signal and also receives the CK signal, such that the GOA stage transfer circuit proceeds with charging of the n scan lines consecutively by sequentially having a first one to an nth one of the n scan lines charged with a first one to an nth one of the n GOA units, respectively, and after the nth one of the n GOA units charged the nth one of the n scan lines, a signal is supplied through the nth one of the n scan line to activate an operation of the at least one TP scan module, wherein m, n, i, and j are all positive integers;
wherein the m scan blocks respectively receive m STV signals that are separate STV signals and the m separate STV signals are respectively and separately supplied to the m scan blocks, wherein the m separate STV signals are independent of each other such that each of the m scan blocks is activated at a time point that is selectively different from or the same as a time point of activation of a different one of the m scan blocks.

2. The touch screen according to claim 1, wherein after an ith scan block accomplishes scanning, an i+1th STV signal is inputted to an i+1th GOA stage transfer circuit to start scanning an i+1th scan block.

3. The touch screen according to claim 1, wherein the m STV signals are respectively inputted to the GOA stage transfer circuits of the m scan blocks to start scanning of the m scan blocks at the same time.

4. The touch screen according to claim 1, wherein the GOA stage transfer circuits of the m scan blocks share the CK signal.

5. A touch screen, comprising m scan blocks,
wherein each of the m scan blocks comprises a gate-driver-on-array (GOA) stage transfer circuit, n scan lines and at least one touch pane (TP) scan module, wherein a first input end of the GOA stage transfer circuit receives a STV signal and a second input end of the GOA stage transfer circuit receives a first CK signal, and the GOA stage transfer circuit comprises n GOA units which are cascade connected and respectively correspond to the n scan lines such that an ith GOA unit of the GOA stage transfer circuit is operable to charge an ith scan line, and one end of the TP scan module receives a second CK signal and the other end of the TP scan module supplies a TP scanning signal, and wherein in a scanning operation, the GOA stage transfer circuit of a jth scan block starts scanning upon receiving a jth STV signal and also receives the first CK signal, such that the GOA stage transfer circuit proceeds with charging of the n scan lines consecutively by sequentially having a first one to an nth one of the n scan lines charged with a first one to an nth one of the n GOA units, respectively, and after the nth one of the n GOA units charged the nth one of the n scan lines, the second CK signal is fed to the other end of the at least one TP scan module to activate an operation thereof, wherein m, n, i, and j are all positive integers;

wherein the m scan blocks respectively receive m STV signals that are separate STV signals and the m separate STV signals are respectively and separately supplied to the m scan blocks, wherein the m separate STV signals are independent of each other such that each of the m scan blocks is activated at a time point that is selectively different from or the same as a time point of activation of a different one of the m scan blocks.

6. The touch screen according to claim 5, wherein after an ith scan block accomplishes scanning, an i+1th STV signal is inputted to an i+1th GOA stage transfer circuit to start scanning an i+1th scan block.

7. The touch screen according to claim 5, wherein the m STV signals are respectively inputted to the GOA stage transfer circuits of the m scan blocks to start scanning of the m scan blocks at the same time.

8. The touch screen according to claim 5, wherein the GOA stage transfer circuits of the m scan blocks share the first CK signal.

9. A smart terminal, comprising a touch screen, which comprises m scan blocks, wherein each of the m scan blocks comprises a gate-driver-on-array (GOA) stage transfer circuit, n scan lines and at least one touch pane (TP) scan module, wherein a first input end of the GOA stage transfer circuit receives a STV signal and a second input end of the GOA stage transfer circuit receives a CK signal, and the GOA stage transfer circuit comprises n GOA units which are cascade connected and respectively correspond to the n scan lines such that an ith GOA unit of the GOA stage transfer circuit is operable to charge an ith scan line, and an nth scan line is coupled to the at least one TP scan module;

wherein in a scanning operation, the GOA stage transfer circuit of a jth scan block starts scanning upon receiving a jth STV signal and also receives the CK signal, such that the GOA stage transfer circuit proceeds with charging of the n scan lines consecutively by sequentially having a first one to an nth one of the n scan lines charged with a first one to an nth one of the n GOA units, respectively, and after the nth one of the n GOA units charged the nth one of the n scan lines, a signal is supplied through the nth one of the n scan line to activate an operation of the at least one TP scan module, wherein m, n, i, and j are all positive integers;

wherein the m scan blocks respectively receive m STV signals that are separate STV signals and the m separate STV signals are respectively and separately supplied to the m scan blocks, wherein the m separate STV signals are independent of each other such that each of the m scan blocks is activated at a time point that is selectively different from or the same as a time point of activation of a different one of the m scan blocks.

10. The smart terminal according to claim 9, wherein after an ith scan block accomplishes scanning, an i+1th STV signal is inputted to an i+1th GOA stage transfer circuit to start scanning an i+1th scan block.

11. The smart terminal according to claim 9, wherein the m STV signals are respectively inputted to the GOA stage transfer circuits of the m scan blocks to start scanning of the m scan blocks at the same time.

12. The smart terminal according to claim 9, wherein the GOA stage transfer circuits of the m scan blocks share the CK signal.

13. A smart terminal, comprising a touch screen, which comprises m scan blocks, wherein each of the m scan blocks comprises a gate-driver-on-array (GOA) stage transfer circuit, n scan lines and at least one touch pane (TP) scan module, wherein a first input end of the GOA stage transfer circuit receives a STV signal and a second input end of the GOA stage transfer circuit receives a first CK signal, and the GOA stage transfer circuit comprises n GOA units which are cascade connected and respectively correspond to the n scan lines such that an ith GOA unit of the GOA stage transfer circuit is operable to charge an ith scan line, and one end of the TP scan module receives a second CK signal and the other end of the TP scan module supplies a TP scanning signal, and wherein in a scanning operation, the GOA stage transfer circuit of a jth scan block starts scanning upon receiving a jth STV signal and also receives the first CK signal, such that the GOA stage transfer circuit proceeds with charging of the n scan lines consecutively by sequentially having a first one to an nth one of the n scan lines charged with a first one to an nth one of the n GOA units, respectively, and after the nth one of the n GOA units charged the nth one of then scan lines, the second CK signal is fed to the other end of the at least one TP scan module to activate an operation thereof, wherein m, n, i, and j are all positive integers;

wherein the m scan blocks respectively receive m STV signals that are separate STV signals and the m separate STV signals are respectively and separately supplied to the m scan blocks, wherein the m separate STV signals are independent of each other such that each of the m scan blocks is activated at a time point that is selectively different from or the same as a time point of activation of a different one of the m scan blocks.

14. The smart terminal according to claim 13, wherein after an ith scan block accomplishes scanning, an i+1th STV signal is inputted to an i+1th GOA stage transfer circuit to start scanning an i+1th scan block.

15. The smart terminal according to claim 13, wherein the m STV signals are respectively inputted to the GOA stage transfer circuits of the m scan blocks to start scanning of the m scan blocks at the same time.

16. The smart terminal according to claim 13, wherein the GOA stage transfer circuits of the m scan blocks share the first CK signal.

* * * * *